United States Patent [19]

Saito et al.

[11] 4,356,437
[45] Oct. 26, 1982

[54] CONTROL CIRCUIT FOR DC MOTORS

[75] Inventors: Tadashi Saito; Toshihiko Nakajima, both of Yokohama; Toshio Osada, Katsuta, all of Japan

[73] Assignee: Hitachi, Ltd., Tokyo, Japan

[21] Appl. No.: 169,795

[22] Filed: Jul. 17, 1980

[30] Foreign Application Priority Data

Jul. 20, 1979 [JP] Japan .................................. 54/91572
Jul. 20, 1979 [JP] Japan .................................. 54/91573
Jul. 20, 1979 [JP] Japan .................................. 54/91574
Sep. 7, 1979 [JP] Japan ................................. 54/114202

[51] Int. Cl.$^3$ ............................................ A02K 29/02
[52] U.S. Cl. ..................................... 318/254; 318/138; 318/439
[58] Field of Search ..................... 318/138, 254, 254 A

[56] References Cited
U.S. PATENT DOCUMENTS 3,453,512 7/1969 Polakowski ......................... 318/138
4,262,237 4/1981 Gelenius ............................. 318/254

Primary Examiner—J. V. Truhe
Assistant Examiner—S. M. Bergmann
Attorney, Agent, or Firm—Antonelli, Terry & Wands

[57] ABSTRACT

There is provided a control circuit for a DC brushless motor suitable for use in acoustic devices or data cassette recorders which comprises a rotor magnet rotating synchronously with the motor rotor, three or more-phase stator windings opposing the rotor magnet and spaced apart therefrom by a slight gap, winding drive circuits for supplying exciting current to the stator windings, and Hall elements for detecting angular positions of the rotor magnet and producing output voltages supplied to the winding drive circuits. The control circuit further comprises a limit voltage setting circuit for setting two limit voltages respectively having upper and lower amplitudes which are symmetrically variable with respect to the central potential of the upper and lower amplitudes, an amplifier circuit associated with each of the Hall elements and amplifying the output voltage from the Hall element with respect to the central potential, and an amplitude limiter circuit limiting upper and lower amplitudes of the amplified output voltage from the amplifier circuit not to exceed the two reference voltages, thereby producing a trapezoidal waveform which in turn is applied to the winding drive circuit.

15 Claims, 20 Drawing Figures

FIG. 5 PRIOR ART
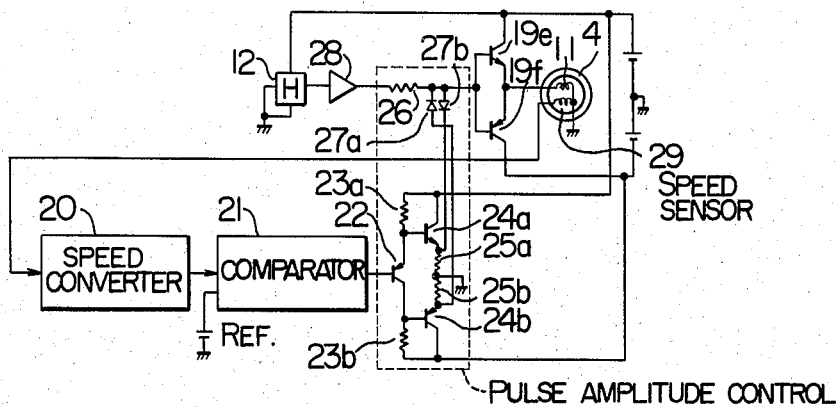
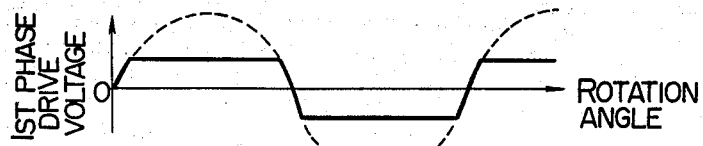
FIG. 6A PRIOR ART
FIG. 6B PRIOR ART
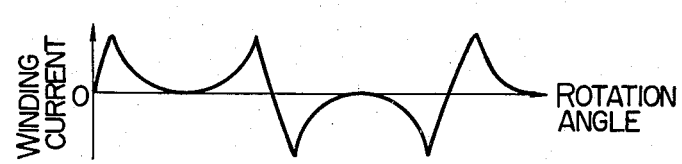
FIG. 6C PRIOR ART

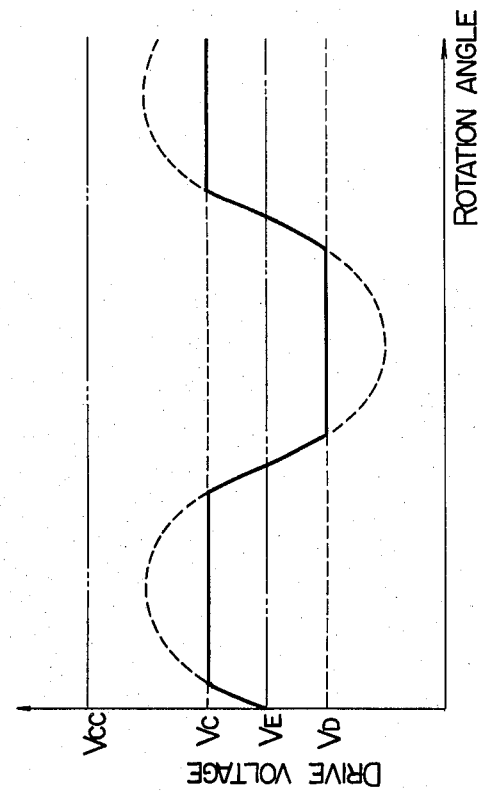
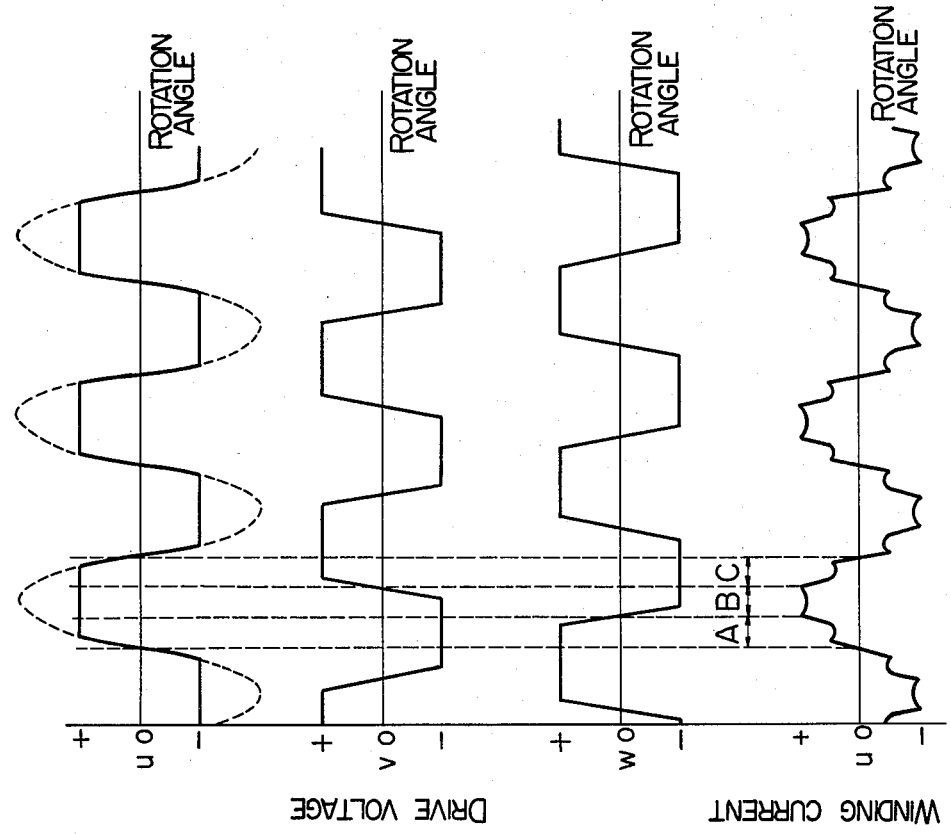

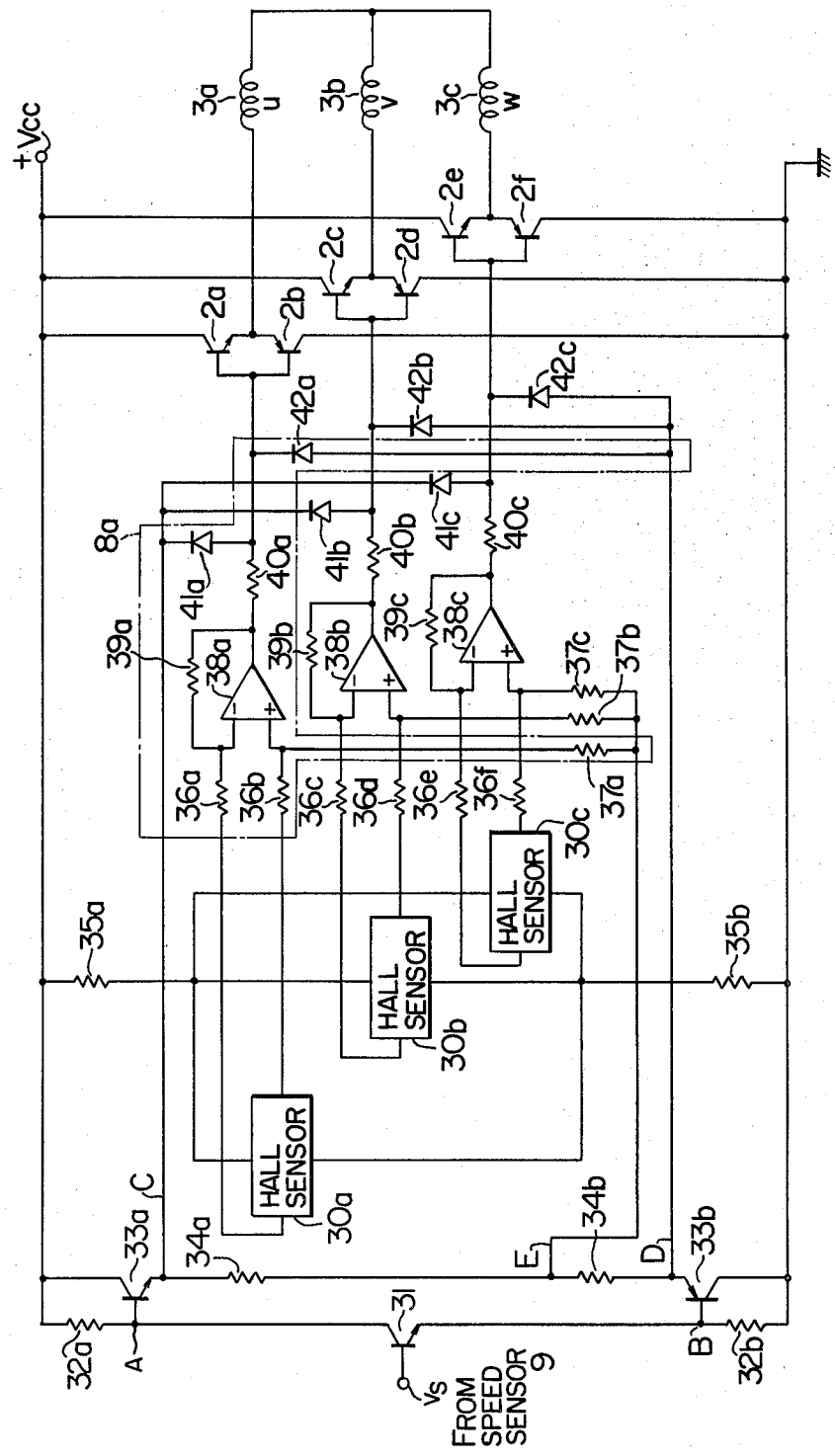
F I G. 9

CONTROL CIRCUIT FOR DC MOTORS

BACKGROUND OF THE INVENTION

The present invention relates to a DC brushless motor and more particularly to a control circuit for a DC brushless motor used as a drive source of an acoustic device such as a tape recorder, record player and video tape recorder or a data cassette recorder.

In a DC brushless motor for driving the acoustic device, for example, a magnetic recording and reproducing apparatus, it is necessary to minimize unwanted disturbance such as torque fluctuation, vibration and noise. Such disturbance is mainly due to switchover of drive current fed to the stator coil or winding of the motor, so-called unitorque motor (trade name) system. One prior art technique pursuant to this system will be described with reference to FIG. 1.

As shown, three rotor position sensor elements 1a, 1b and 1c associated with the rotor of a motor at predetermined rotation angles detect the position of a magnet 4. Detection outputs are supplied to motor coil drive transistors 2a to 2f via a position signal processing circuit 7. Three drive windings 3a, 3b and 3c are connected in star connection (Y-connection) so that bidirectional current can be passed through these windings. A current detecting resistor Rc is provided to prevent occurrence of a period for non-conduction in respect of any three windings and occurrence of a period for current conduction in parallel in respect of the windings of two phases. A detected voltage drop across the resistor Rc is applied to the processing circuit 7. Thus, currents flowing through the drive windings of three phases are so controlled as to be constant in total. A rotor speed signal is detected by a speed sensor 9 and is converted by a frequency-to-voltage converter 10 (F/V converter) into a voltage signal $v_s$. The signal $v_s$ is applied to the processing circuit 7.

Voltage waveforms as shown in FIG. 2 are applied across respective drive windings of three phases, of which two phases are constantly placed in series connection to pass current therethrough. More particularly, FIG. 2 shows a period A during which u-phase and v-phase windings are placed in series connection to pass therethrough current directed from u-phase to v-phase, a period B during which current is directed from u-phase to w-phase, and a period during which current is directed from v-phase to w-phase. Although this system can make full use of the three drive windings for current conduction, when period A shifts to period B, the total current which has been passed through the u-phase drive winding is switched from v-phase to w-phase with delayed initiation due to an inductance of the drive winding, causing an undesired notch as shown in FIG. 2 to take place in the coil current. In addition, since the rotor magnet 4 generates a magnetic field of a flux density distribution as shown by a dotted line, torque generation accruing from current flow in each of the drive windings is rapidly changed when current flow in each drive winding initiates and then terminates, resulting in such troubles as vibration noise and irregular rotation. These troubles are fatal to the motor for use in acoustic devices.

In an attempt to minimize the disturbance due to changeover of drive currents it has conventionally been employed that the drive current is changed over gradually in a sinusoidal fashion as shown in FIG. 3.

In FIG. 3, two-phase stator coils 11a and 11b are held in place to oppose the rotor magnet (not shown) rotatable in synchronism with the motor shaft and are spaced apart from the rotor magnet by a slight gap. Flow of drive current is switched between the stator coils 11a and 11b by means of Hall elements 12a and 12b which detect the position of the rotor. Changes in magnetic field responsive to the rotation of the rotor magnet and corresponding to locations of the Hall elements 12a and 12b are detected by these Hall elements and output signals therefrom, which are representative of the rotor position, vary in a sinusoidal fashion as the rotor rotates. The rotor position signal from the Hall element 12a is amplified by a differential amplifier comprised of resistors 15a, 15b, 16a and 17a and an operational amplifier 18a, and is then applied to the stator coil 11a via a drive circuit comprised of power transistors 19a and 19c. The other Hall element 12b and stator coil 11b are spaced apart from the Hall element 12a and from the stator coil 11a by an electrical angle of 90°. The rotor position signal from the Hall element 12b is also amplified by a differential amplifier comprised of resistors 15c, 15d, 16b and 17b and an operational amplifier 18b and is then applied to the stator coil 11b via a drive circuit comprised of power transistors 19b and 19d.

Applied to the stator coils 11a and 11b are drive voltages $e_1$ and $e_2$ having waveforms as shown in FIG. 4. It will be appreciated from the figure that the sinusoidal voltages $e_1$ and $e_2$ to be applied to the stator coils 11a and 11b are out of phase by an electrical angle of 90° with respect to each other. A resistor 14 and a transistor 13 serve to feed bias current (Hall current) to the Hall elements 12a and 12b. When a high voltage is applied to a terminal $v_s$ connected to the base of the transistor 13, the Hall currents increase. Since the output voltages from the Hall elements are substantially in proportion to the Hall currents, the drive voltages $e_1$ and $e_2$ to be applied to the stator coils are increased in their amplitudes in the sinusoidal form. Conversely, with a low voltage applied to the base of the transistor 13, the amplitudes of the drive voltages $e_1$ and $e_2$ decrease.

Thus, with the control circuit of FIG. 3, drive current is allowed to flow through either one of the two stator coils dependent on the location of the rotor to thereby generate torque so that so-called dead angle (dead point) at which the motor is prevented to start will not occur. In addition, the sinusoidal, gradual switchover of the drive current prevents generation of unwanted torque fluctuation and noise. Moreover, by adjusting the base potential of the transistor 13, torque and rotation speed of the motor can desirably be controlled.

The prior art control circuit of FIG. 3, in which the rotor position signal detected by the position sensor such as for example Hall element 12a or 12b is amplified and directly coupled to the stator coil 11a or 11b for driving the same, is however still disadvantageous as being susceptible to irregularities in sensitivity of the Hall element and irregularities in characteristics of the Hall element due to its manufacture process, for example, offset of the output voltage. To cope with these problems, it is necessary to use Hall elements of twin characteristics and to adjust the gain of the differential amplifier and the offset, thus raising the cost of products.

To eliminate the disadvantages of the prior art control circuit shown in FIG. 3, a proposal has been made as disclosed in Japanese patent application No. 52-94217 of the present assignee, laid open as Japanese Patent laid-open No. 54-29010 on Mar. 3, 1979 wherein the output signal from the Hall element is amplified and thereafter the amplified amplitude is restricted to a predetermined value so as to be applied to the stator coil. An example of this proposal as shown in FIG. 5 will be described by referring to FIG. 6 showing signal waveforms occurring in the example.

In FIG. 5, a comparison amplifier 21 is designed to deliver an output voltage which is in inverse proportion to rotation speed of the motor. A transistor 22 is adapted to produce two, positive and negative, control voltages which vary analogously to the output voltage from the comparison amplifier 21. When resistances of resistors 23a and 23b are set to be equal, positive and negative control voltages of the same magnitude develop at emitter and collector terminals of the transistor 22, respectively. These control voltages at the emitter and collector terminals of the transistor 22 are subtracted by base-emitter voltages of transistors 24a and 24b and applied across load resistors 25a and 25b of transistors 24a and 24b. The amplitude of a rotor position signal from a Hall element 12 is amplified by an amplifier 28 and restricted by a resistor 26 and diodes 27a and 27b. Accordingly, a drive voltage applied to the stator coil 11a takes the form of a trapezoid as shown in FIG. 6A. Similarly, drive voltage applied to the stator coil 11b is as shown in FIG. 6B.

The prior art control circuit shown in FIG. 5 is not so affected as the prior art circuit shown in FIG. 3 by irregularity in sensitivity of the Hall element and offset of the Hall element and the amplifier. In addition, the FIG. 5 control circuit can enjoy the advantage of gradual switchover of current that the FIG. 3 control circuit has. But current flow in the stator coil 11a or 11b is affected by a substantially sinusoidal counterelectromotive force generated in the coil and distorted as shown in FIG. 6C. Thus, the amplitude of the counterelectromotive force is maximized to reduce the most effective level of the drive current, and the drive current can maintain its effective level only at current switchover points with the result that efficiency of current is greatly degraded. In this manner, since a large amount of current flow takes place near the current switchover point at which the generation of torque is depressed, unwanted vibration, noise and electromagnetically inductive noise due to the drive current are caused. In tape recorders and video tape recorders, the electromagnetically inductive noise adversely interferes with the magnetic head.

Moreover, the control circuits of FIG. 3 and FIG. 5 require positive and negative sources of electrical power and dependent on the rotor position, only one power supply is used to supply the drive current to the stator coil. Accordingly, in order to produce a sufficient starting torque independent of the stopping position of the rotor, it is necessary to increase capacity of the single power supply such that drive current necessary for starting the motor can be fed from the one power supply. The power supply of increased capacity is expensive and raises the production cost.

SUMMARY OF THE INVENTION

The present invention contemplates elimination of the prior art drawbacks and has for its object to provide a brushless DC motor having a speed control circuit which permits smooth rotation of the motor, and which is suitable for applications such as acoustic devices and data processing devices.

Another object of the present invention is to provide a multi-phase transistor DC motor whose rotational speed control circuit can reduce noise upon switchover of multi-phase drive currents for the motor and which can produce highly efficient drive current for generation of torque.

Another object of the present invention is to provide an inexpensive control circuit for a DC motor which is free from irregularity in sensitivity of sensor, for example, a Hall element for detecting the rotational or angular position of the motor rotor and by offset of output voltage from the sensor.

According to the present invention, drive coils of at least three phases are successively power switched over such that two-phase coils are placed in parallel connection and the remaining one phase coil responsible for generation of the maximum torque is placed in series with the parallel connection, thereby preventing current switchover at the time of the maximum current conduction. In addition, voltages applied to the coils upon switchover of currents can be varied smoothly to ensure smooth change of current. Consequently, a highly practical motor, especially for use in an acoustic device, can be obtained in which minimal torque fluctuation leading to high efficiency and reduction in noise and vibration can be attained.

The present invention is further featured by a control circuit for a DC motor with multi-phase, at least three-phase motor coils connected in star connection, which comprises a single source of electrical power, two reference voltages, an amplifier circuit which amplifies the output voltage of a field sensor with respect to the central potential of the two reference voltages, and an amplitude limiter circuit which limits upper and lower amplitudes of the amplified output voltage so as not to exceed the two reference voltages.

The present invention is further featured by a motor drive current control circuit which comprises two reference voltages which are set such that upper and lower voltage levels of the reference voltages are symmetrically variable with respect to the central potential of the two reference voltages, an amplifier circuit which amplifies the output voltage of a field sensor with respect to the central potential, and an amplitude limiter circuit which limits upper and lower amplitudes of the amplified output voltage so as not to exceed the two reference voltages.

Preferably, in the above control circuit, the first reference voltage is variable and the second reference voltage is fixed.

BRIEF DESCRIPTION OF THE DRAWINGS

FIG. 5 is a circuit diagram showing a prior art motor control circuit in which the stator coil drive voltage is limited.

FIGS. 6A to 6C are diagrams showing signal waveforms in the circuit shown in FIG. 5.

FIG. 8 is a diagram showing waveforms of drive voltage and coil current in the motor drive control circuit shown in FIG. 7.

FIG. 9 is a circuit diagram showing one embodiment of a stator coil drive control circuit according to the present invention.

FIG. 10 is a diagram showing waveform of stator coil drive voltage produced from the circuit shown in FIG. 9.

In the Figures, like reference numerals designate like parts.

DESCRIPTION OF THE PREFERRED EMBODIMENTS

Figure 4:
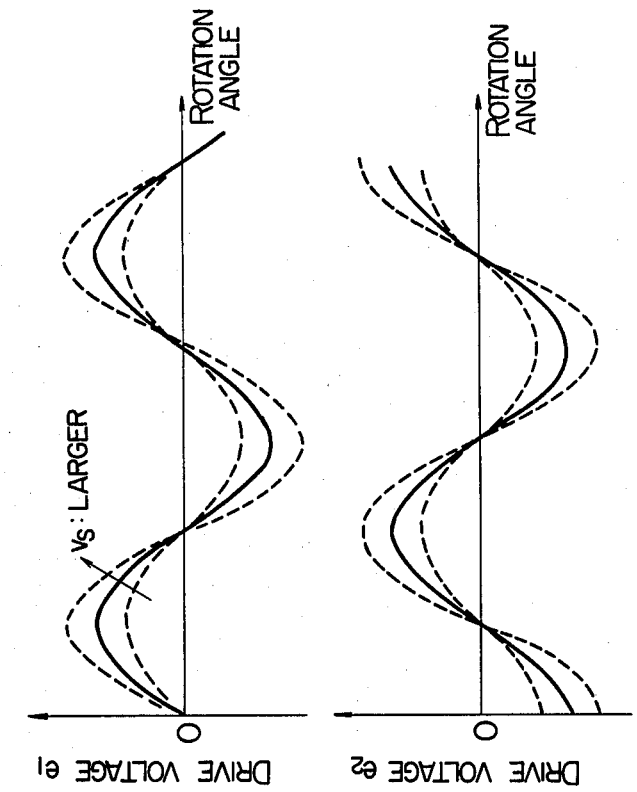
FIG. 4 is a diagram showing waveforms of stator coil drive voltage.
Figure 1:
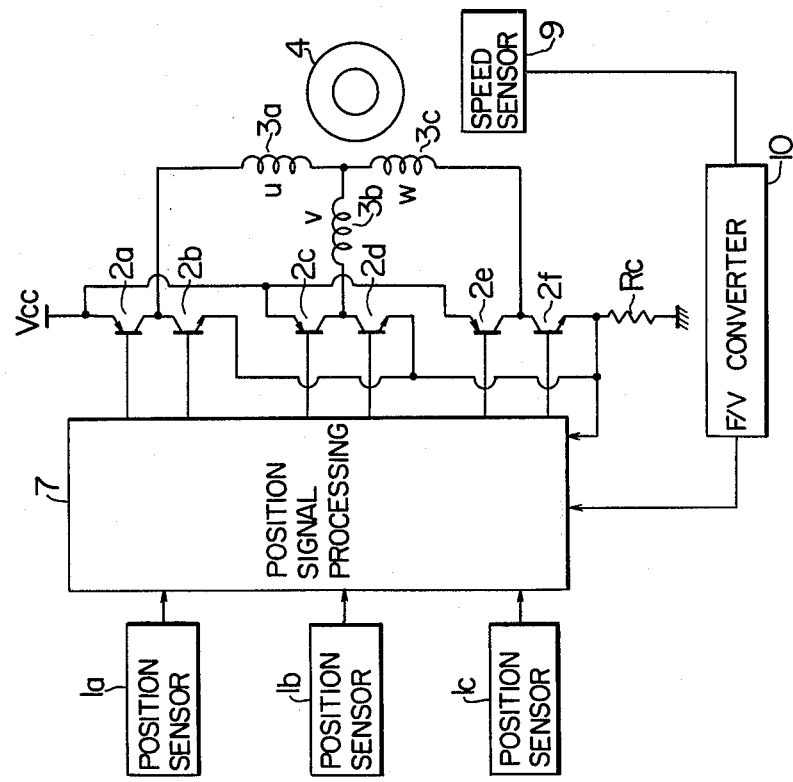
FIG. 1 is a schematic circuit diagram showing a prior art drive control system for a DC motor for use in an acoustic device.
Figure 7:
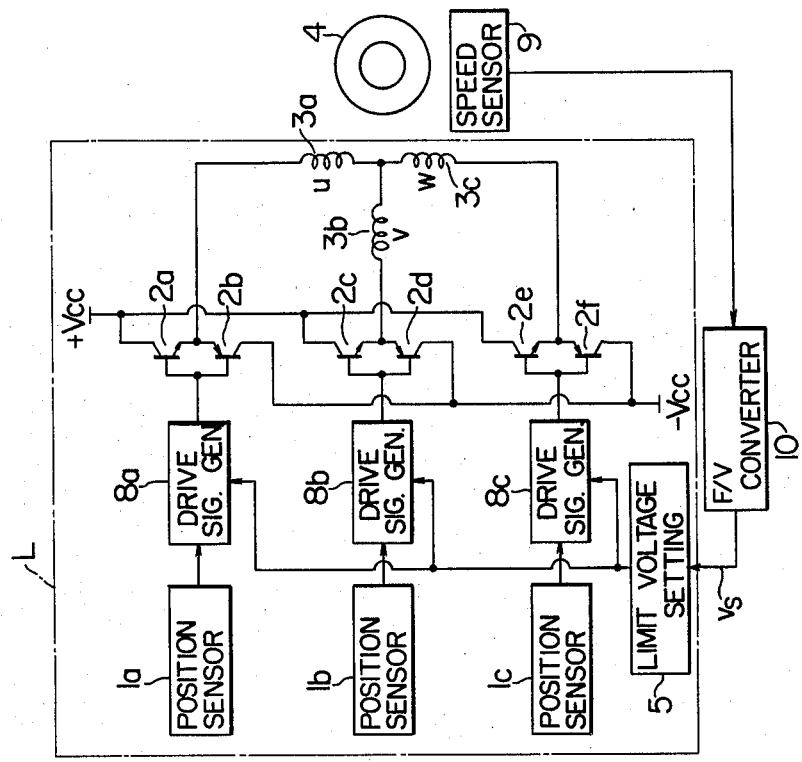
FIG. 7 is a schematic circuit diagram showing one embodiment of a motor drive control circuit according to the present invention.

Referring now to FIG. 7, one embodiment of the invention will be described. As shown, rotor position sensors $1a$ to $1c$ such as for example Hall elements are adapted to detect magnetic flux interlinking drive coils $3a$ to $3c$. Outputs of the rotor position sensors $1a$ to $1c$ are applied to drive signal generators $8a$ to $8c$ for amplitude adjustment. Outputs of the drive signal generators $8a$ to $8c$ are respectively applied to one end of each of the drive coils $3a$ to $3c$ via drive transistors $2a$ to $2f$. Three-phase coils are shown herein for illustration only but the drive coils may be of three or more phases, i.e., of a multi-phase in general. The drive coils $3a$ to $3c$ are connected in common at the other end to establish a star connection. Namely, the multi-phase drive coils are coupled to form a star connection.

A speed sensor 9 is provided to detect the rotation speed of a rotor magnet 4. The detected rotation speed is converted by a frequency-to-voltage (F/V) converter 10 into a DC voltage signal $v_s$ which in turn is supplied to a limit voltage setting circuit 5. The circuit 5 is responsive to the voltage siganl $v_s$ to produce upper and lower reference voltages which determine upper and lower limit voltages of drive signal generators $8a$–$8c$ each including a linear amplifier and an amplitude limiter. A block L indicated by a dot-chain like represents a motor drive control circuit including stator coils.

Voltages applied to the coils $3a$ to $3c$ of the FIG. 7 circuit and current therein are shown in FIG. 8. The rotor position sensors $1a$ to $1c$ deliver output voltage signals which are in proportion to a tangential flux density distribution of the rotor magnet 4. The rotor magnet 4 is difficult to magnetize with a flux density distribution of rectangular form so that a pseudo-sinusoidal output (drive-voltage waveform u) output as shown at dotted lines in FIG. 8 is usually obtained. The pseudo-sinusoidal output is sliced or clipped by the amplitude limiter of the drive signal generator $8a$, $8b$ or $8c$ to produce a trapezoidal waveform of a fixed amplitude as shown at solid lines. Namely, the drive signal generators $8a$–$8c$ operate as linear amplifiers near the polarity changing point. The drive transistors $2a$ to $2f$ also act as linear amplifiers. Consequently, the pseudo-sinusoidal outputs from the rotor position sensors $1a$ to $1c$ are in part amplified linearly and applied to the drive coils $3a$ to $3c$, thereby ensuring smooth switchover of the drive current. On the other hand, the amplitude limiters become non-linear near the maximum amplitude of the pseudo-sinusoidal output voltage and hence the output voltages from the rotor position sensors $1a$ to $1c$ are sliced or clipped at a potential which is in proportion to the magnitude of the output from the F/V converter 10. Accordingly, the amplitude of the drive voltage is unaffected by irregularity in the output voltage from the rotor position sensor $1a$, $1b$ or $1c$. In such an arrangement, there is a phase difference of 120° in terms of electrical angle between drive coils $3a$ to $3c$ respectively associated with u, v and w-phases and between the rotor position sensors $1a$ to $1c$. Accordingly, drive voltages on the drive coils $3a$ to $3c$ are out of phase from each other by an electrical angle of 120° as shown at u, v and w in FIG. 8.

Figure 2:
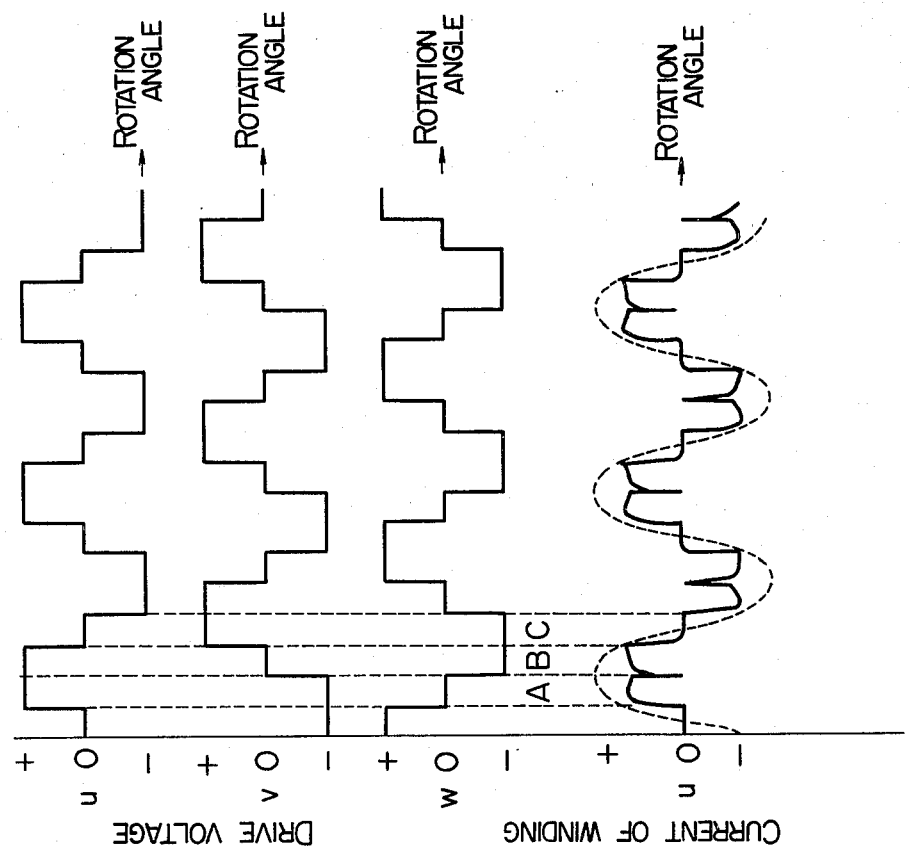
FIG. 2 is a diagram showing waveforms of drive voltage and coil current in the motor shown in FIG. 1.
Figure 3:
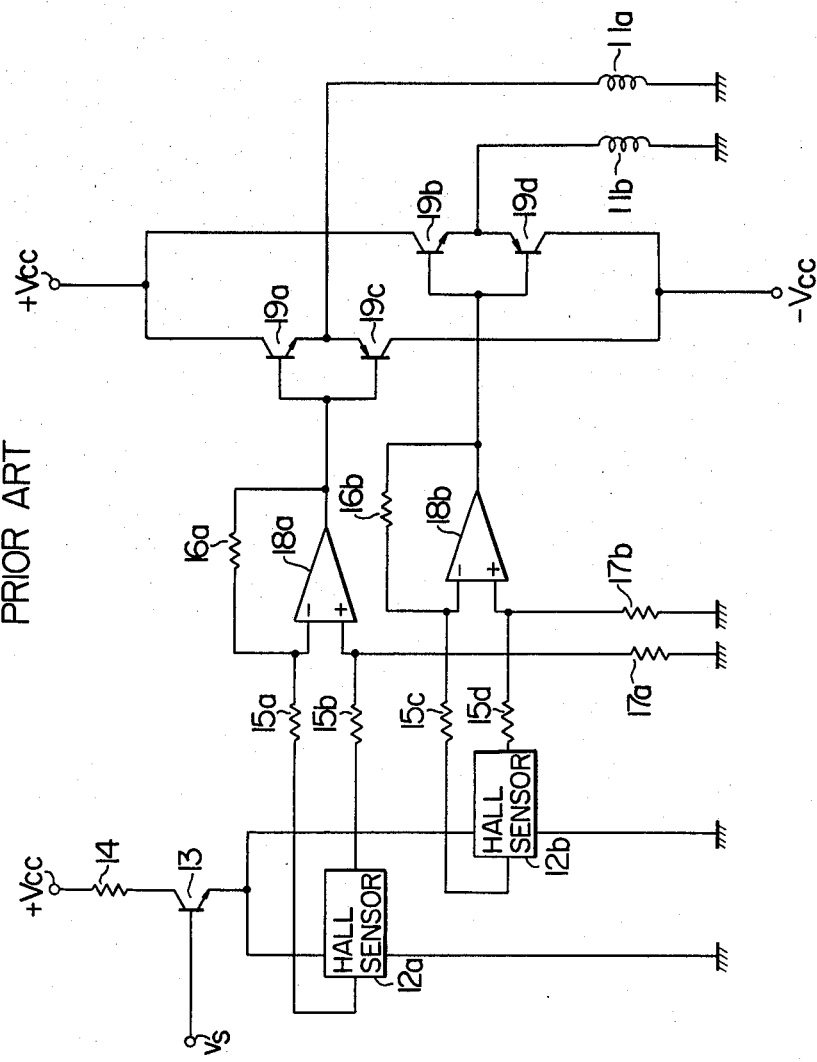
FIG. 3 is a circuit diagram showing a prior art drive control circuit for a DC motor.

The lowermost waveform in FIG. 8 is illustrative of current in the u-phase drive coil. Since the three-phase drive coils are connected in star connection, during a period A as shown in FIG. 8, currents coming into the u and w-phase drive coils are totalized and the resulting total current flows in the v-phase drive coil so that the current in the u-phase drive coil is about half the current in the v-phase drive coil. Subsequently, during a period B, the current coming into the u-phase drive coil branches to the v and w-phase drive coils, and during a period C, currents in the u and v-phase drive coils are totalized to run into the w-phase drive coil. Accordingly, as shown at current waveform u in FIG. 8, the current in the u-phase drive coil approximates the flux density distribution stepwise, thereby ensuring smooth switchover of the drive current. The drive current rises when period A shifts to period B and lowers when period B shifts to period C by an amount which is half the amount as for the prior art circuit shown in FIG. 2. In addition, although the drive current lowers when period C shifts to the next period by an amount which is equal to the amount as for the FIG. 2 circuit, the field flux is nearly zero in this phase of shifting and for this reason, change of torque, torque fluctuation, vibration and noise can be reduced as compared with the prior art circuit.

Further, in this embodiment, voltage applied to each of the drive coils $3a$ to $3c$ becomes zero only for an instant that the polarity of the voltage changes from positive to negative and therefore there occurs no period during which substantial current flow disappears. As a result, the three-phase drive coils constantly participate in generation of torque, thus giving rise to high efficiency.

Moreover, the drive voltage is sliced to be formed into the trapezoidal wavefore which rises and falls at an inclination so that the drive current also rises and falls at the corresponding inclination. This is effective to ensure smooth switchover of the three-phase drive currents. Although two sources of electrical power, positive and negative, were used in the above embodiment, the present invention is not limited to such a case but can employ a single power supply with its negative pole grounded.

Turning to FIG. 9, there is shown a DC brushless motor control circuit embodying the present invention, which corresponds to the block L of FIG. 7. In the Figure, a transistor 31 and resistors 32a and 32b having the same resistance constitute a unit gain amplifier.

Assuming that a control voltage applied to the base of the transistor 31 is $v_s$, and a base-emitter voltage drop is $v_{BE}$, potential $V_B$ as expressed by, $$V_B = v_s - v_{BE}$$

develops at a point B. When neglecting currents coming into the bases of transistors 33a and 33b, currents flowing through the resistors 32a and 32b of the same resistance are identical with each other and a potential $V_A$ at a point A is, $$V_A = Vcc - V_B$$

where Vcc denotes a voltage of the source of electrical power. Consequently, by varying the control voltage $v_s$, potentials $V_A$ and $V_B$ can be varied cooperatively in the opposite directions while the central potential of the potentials $V_A$ and $V_B$ is maintained to be half the Vcc.

The transistors 33a and 33b are connected in an emitter follower fashion. Then, when neglecting base-emitter voltage drops of the transistors 33a and 33b, a potential $V_C$ at a point C is equal to $V_A$ and a potential $V_D$ at a point D is equal to $V_B$. Since resistors 34a and 34b are designed to have the same resistance, a potential $V_E$ at a connecting point E is the central potential of potentials $V_C$ and $V_D$ which is approximately half the Vcc.

Three, as exemplified in this embodiment, Hall sensors 30a to 30c formed of Hall elements are adapted to detect the angular position of the rotor magnet or the rotary shaft of the motor. These sensors are out of phase from each other by an electrical angle of 120° C. Each of the Hall sensors is connected across the source of electrical power of +Vcc and ground via resistors 35a and 35b of the same resistance. The sinusoidal rotor position signal detected by the Hall sensor 30a is amplified by a differential amplifier comprised of resistors 36a, 36b, 37a and 39a and an operational amplifier 38a with respect to the central potential $V_E$. The drive signal generator 8a includes the differential amplifier and a limiter formed of elements 40a, 41a and 42a. Upper and lower amplitudes of the amplified rotor position signal are clipped at the two reference voltage levels Vc and $V_D$. After clipped, the amplified rotor position signal is fed to the stator coil 3a via a coil drive circuit comprised of power transistors 2a and 2b. Consequently, the voltage applied to the stator coil 3a corresponds to the sinusoidal rotor position signal whose upper and lower amplitudes are clipped at the reference voltage levels $V_C$ and $V_D$ to take the form of a trapezoidal waveform as shown in FIG. 10.

Figure 11:
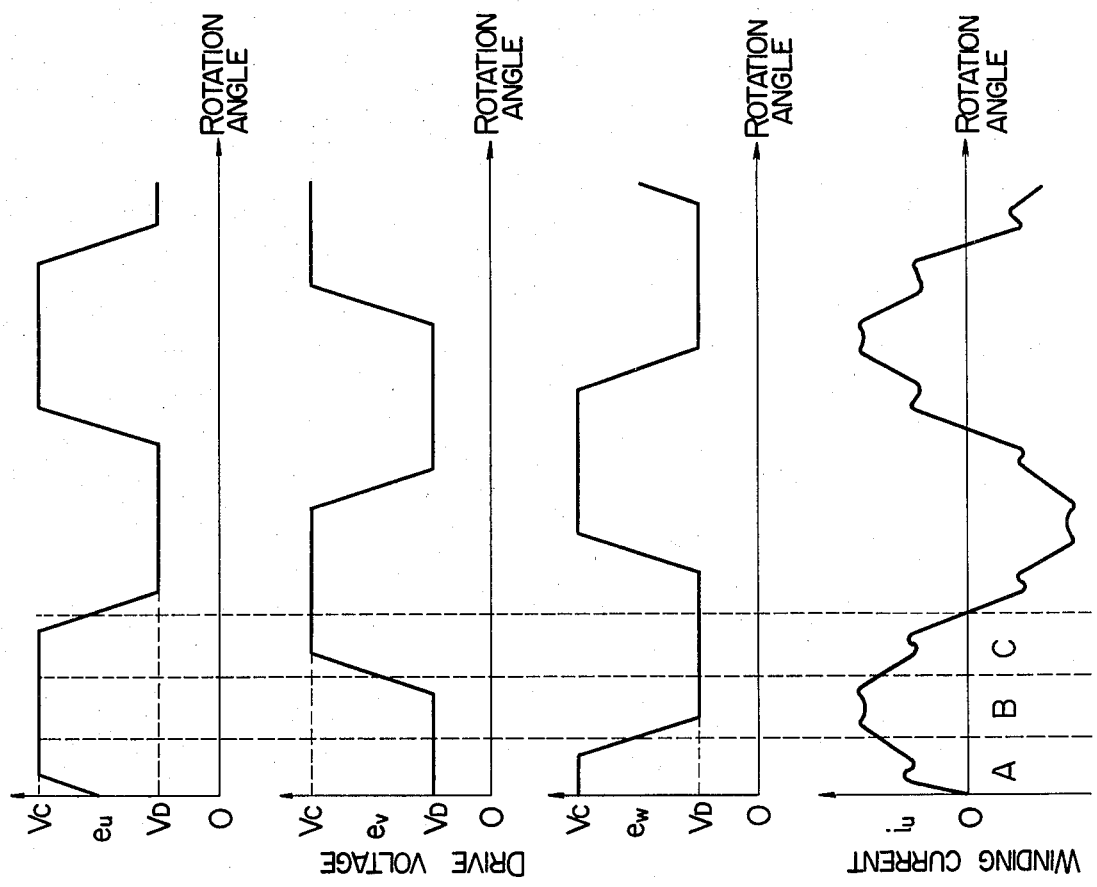
FIG. 11 is a diagram showing waveforms of drive voltage and drive current produced from the circuit shown in FIG. 9, which drive voltage is adapted to drive a single power supply type, three-phase stator coils and which drive current appears on one phase.

Similar to the Hall sensors 30a to 30c, the stator coils 3a to 3c are out of phase from each other by an electrical angle of 120° C. Therefore, like the rotor position signal detected by the Hall sensor 30a, the amplitudes of rotor position signals from the Hall sensors 30b and 30c are so limited as to be converted into trapezoidal waveforms which in turn are fed to the stator coils 3b and 3c. Drive voltages $e_u$, $e_v$ and $e_w$ respectively applied to the three-phase stator coils 3a to 3c have waveforms and phase relationship as shown in FIG. 11. The stator coils 3a to 3c are connected in star connection, and current in one-phase stator coil is determined by a voltage across this stator coil, the difference between voltages across the remaining two-phase stator coils, and a counterelectromotive force induced in each of the three stator coils.

During a period A as shown in FIG. 11, u and w-phase voltages bear $V_C$ and v-phase voltage bears $V_D$. Under this condition, currents in the u and w-phase stator coils are totalized and the resulting total current runs into the v-phase stator coil. During a period B, the w-phase voltage changes from $V_c$ to $V_D$ and as a result, current directed from the w-phase stator coil to the v-phase stator coil disappears and instead, current directed from the u-phase stator coil to the w-phase stator coil takes place. In other words, the current in the u-phase stator coil branches to the v and w-phase stator coils. During a period C, the v-phase voltage changes from $V_D$ to $V_C$ and hence current directed from the u-phase stator coil to the v-phase stator coil disappears and instead, current directed from the v-phase stator coil to the w-phase stator coil takes place. Thus, currents in the u and v-phase stator coils run into the w-phase stator coil.

In this manner, half the amount of current flowing through each of the stator coils is gradually and successively oriented or switched over to different directions and excepting the instant of the current switchover, currents will constantly flow through the three-phase stator coils. In addition, in the stator coil participating in generation of the maximum torque, current which is twice as large as currents in the remaining stator coils will flow constantly, thereby ensuring high current efficiency. Accordingly, vibration and noise due to the current switchover can be minimized. Further, the current flow in the stator coil is not wasted and hence electromagnetically inductive noise can be minimized.

The amplitude of the drive voltages $e_u$, $e_v$ and $e_w$ for the stator coils 3a, 3b and 3c determined by $V_C$ and $V_D$ is dependent on the base potential $v_s$ of the transistor 31. By varying the control signal $v_s$, the drive voltage amplitude can be adjusted to obtain desired torque and rotation speed. When the control signal $v_s$ is varied, the $V_C$ and $V_D$ are varied symmetrically with respect to the center potential $V_E$. For example, when the $v_s$ is increased, the Vc is decreased whereas the $V_D$ is increased by the decrement of the Vc. As a result, the amplitude of the stator coil drive voltage is decreased while the central potential $V_E$ of the $V_C$ and $V_D$ being maintained at half the Vcc. Conversely, when the control signal $v_s$ is decreased, the amplitude of the stator coil drive voltage increases and in this case, the central potential $V_E$ also remains unchanged. In this manner, it is possible to vary the amplitude of the drive voltage between approximate Vcc of the supply voltage and zero level. In addition, since the central potential $V_E$ remains unchanged, power consumption in the NPN type power transistors 2a, 2c and 2e is made equal to that in the PNP type power transistors 2b, 2d and 2f, these transistors constituting the stator coil drive circuit. In place of the rotor speed signal the control signals $v_s$ may be one representative of a tape speed which is detected from a tape recorder of reel-to-reel drive type or a data cassette recorder.

Figure 12:
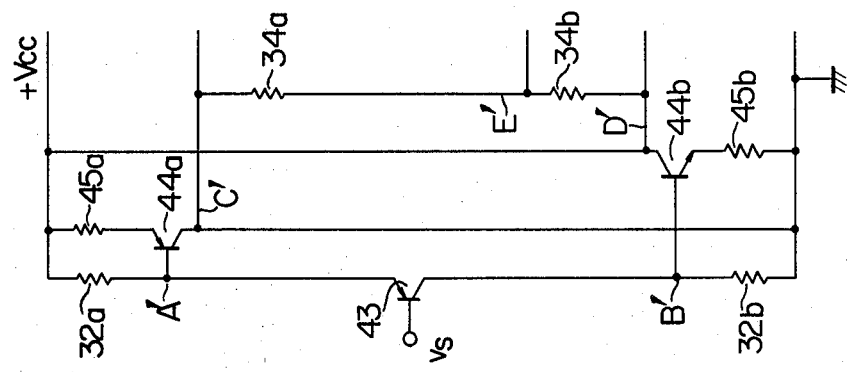
FIG. 12 is a circuit diagram showing a partial modification of the circuit shown in FIG. 9.

FIG. 12 shows a partial modification of the embodiment described above, which modification comprises PNP type transistors 43 and 44a, an NPN type transistor 44b, and resistors 45a and 45b. A control voltage $v_s$ is applied to the base of the transistor 43. Points A', B', C′, D′ and E′ in FIG. 12 correspond to points A, B, C, D and E in the FIG. 9 embodiment. In this modification, the PNP type transistor 43 substitutes for the NPN type transistor 31 in FIG. 9, and the emitter-follower circuit shown in FIG. 12 substitutes for the emitter-follower circuit in FIG. 9 which is constituted by the transistors 33a and 33b. Obviously, this modification performs the same operation and attains the same effect as the FIG. 9 embodiment.

According to the FIG. 9 embodiment and FIG. 12 modification, it is possible to make equal the amplitudes of the drive voltages applied to the respective stator coils. By this, the control circuit can be unaffected by irregularity in characteristics of the field sensors, especially Hall sensors, and the bidirectional drive current in each of the stator coils can be substantially sinusoidal with the single source of electrical power.

Figure 13:
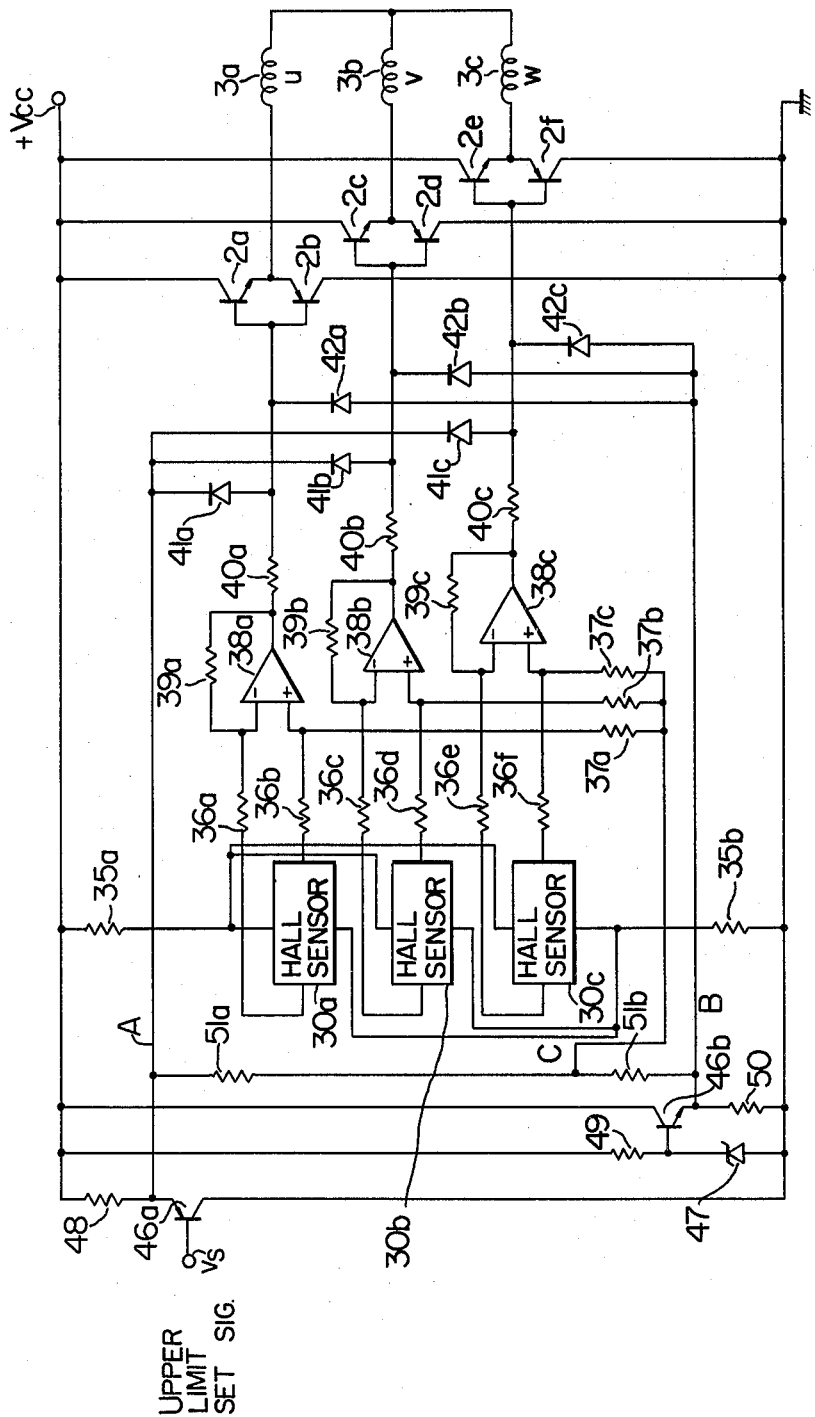
FIG. 13 is a circuit diagram showing another embodiment of the present invention.

FIG. 13 shows another embodiment of the present invention which starts from the FIG. 9 embodiment. In FIG. 13, the base potential $v_s$ of an emitter-follower transistor 46a is varied to change a potential $V_A$ at a point A. Another emitter-follower transistor 46b has the base maintained at a fixed potential by means of a constant voltage diode 47 to make constant a potential $V_B$ at a point B. Resistors 51a and 51b have the same resistance and central potential $V_C$ of the $V_A$ and $V_B$ develops at a point C. Similarly to the FIG. 9 embodiment, the amplitude of the amplified rotor position signal is confined between the reference potentials $V_A$ and $V_B$.

Figure 18:
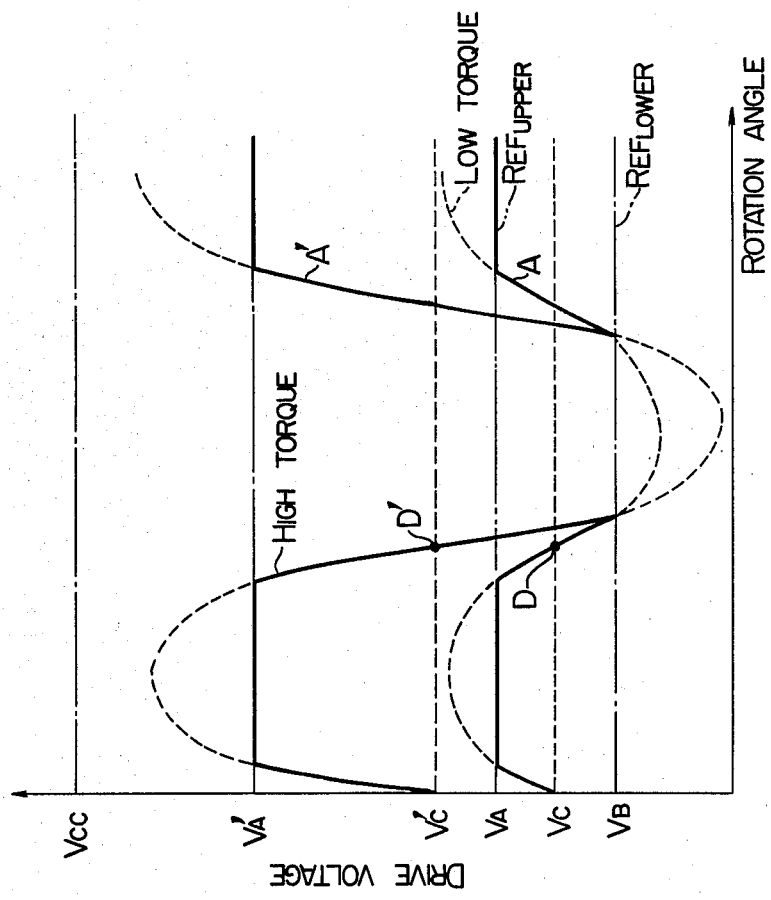
FIG. 18 is a diagram showing waveforms useful to explain the operation of circuits in the embodiments shown in FIGS. 15 to 17.

The amplitude of drive voltages $e_u$, $e_v$, and $e_w$ for the stator coils 3a, 3b and 3c is determined by $V_A$ and $V_B$, the latter reference potential $V_B$ being fixed by the constant voltage diode 47. The former reference potential $V_A$ is variable depending on the base potential $v_s$ of the transistor 46a. Accordingly, the amplitude of the stator coil drive voltage can be adjusted by varying the $v_s$ to obtain desired motor torque and rotation speed. Thus, when the $V_A$ is varied, the central potential $V_C$ of the $V_A$ and $V_B$ varies simultaneously. Since the output voltage from the Hall element is amplified with respect to the central potential $V_C$, DC potential of the drive voltage varies. However, the phase of current switchover point (point D in FIG. 18) remains unchanged so that the drive current switchover can correctly be achieved symmetrically in positive and negative directions. Moreover, due to the fact that the drive voltage waveform depends on only $V_A$, $V_B$ and $V_C$, that the $V_A$ is determined by the externally applied $v_s$, and that the $V_B$ is fixed at a Zener voltage of the constant voltage diode, any fluctuations (ripples) caused in the supply voltage Vcc will not affect the drive voltage waveform and the motor continues to rotate stably unless the fluctuations affect the operation of the emitter-follower transistor 46a and power transistor constituting the coil drive circuit.

Figure 14:
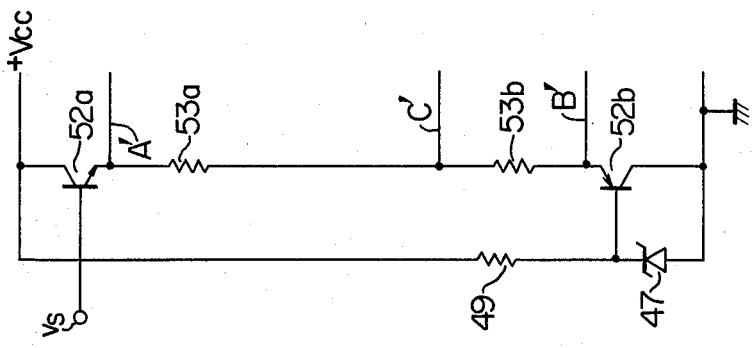
FIG. 14 is a circuit diagram showing a partial modification of the circuit shown in FIG. 13.

FIG. 14 shows a partial modification of the FIG. 13 embodiment which comprises an NPN type transistor 52a, a PNP type transistor 52b, and resistors 53a and 53b. A control voltage $v_s$ is applied to the base of the transistor 52a. Points A′, B′ and C′ respectively correspond to points A, B and C in the FIG. 13 embodiment. In this modification, the NPN type transistor 52a substitutes for the PNP type transistor 46a in FIG. 13, and the PNP type transistor 52b substitutes for the NPN type transistor 46b in FIG. 13 to thereby achieve the same operation and effect as the FIG. 13 embodiment.

Figure 15:
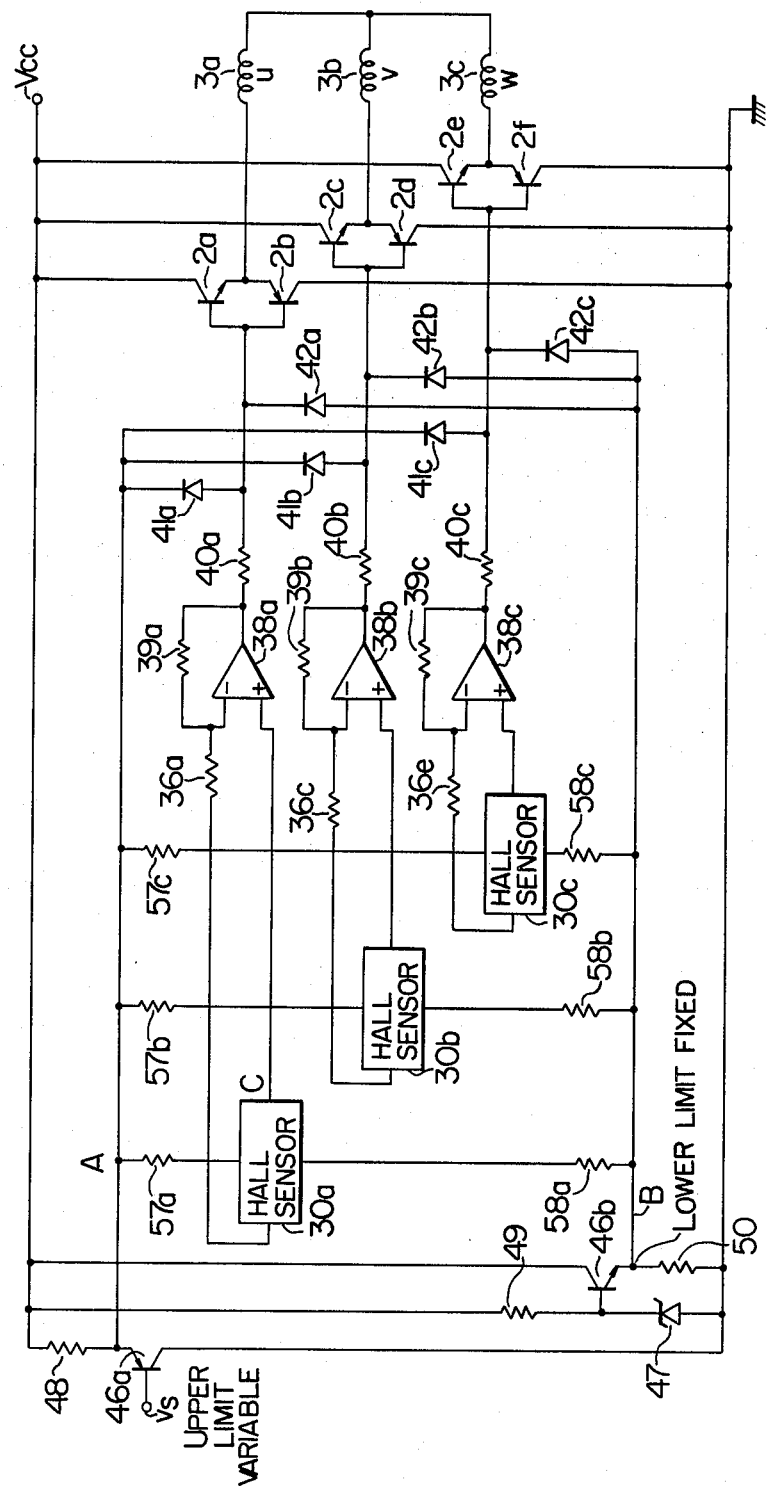
FIGS. 15 to 17 are circuit diagrams showing further embodiments of the present invention.

FIG. 15 shows another embodiment of the invention wherein the FIG. 13 circuit is simplified. In FIG. 15, a transistor 46a is connected in an emitter-follower manner. By varying the base potential $v_s$, a potential $V_A$ at output point A of the emitter-follower transistor 46a can be varied to adjust and set the upper limit potential. A transistor 46b, also in emitter-follower connection, has the base whose potential is fixed by a constant voltage diode 47, so that a potential $V_B$ at output point B of the emitter-follower transistor 46b is fixed to set the lower limit potential.

Hall elements 30a, 30b and 30c provided on the stator side in opposite relation with and corresponding to three-phase drive coils 3a, 3b and 3c detect the angular position of the motor rotor. The respective Hall elements have current supply terminals connected across points A and B via resistors 57a, 57b and 57c and via resistors 58a, 58b and 58c, respectively. Considering a circuit associated with one (30a) of the three Hall elements, the resistors 57a and 58a have the the same resistance value which is sufficiently larger than an internal resistance at the input terminal of the Hall element 30a and determine the value of current passing through the Hall element. Thus, one output terminal (point C) of the Hall element 30a bears a potential $V_C$ which approximates the central potential of $V_A$ and $V_B$. In other words, the Hall element is biased at the center potential. By this, the sinusoidal position signal detected by the Hall element 30a is amplified by a differential amplifier comprised of resistors 36a and 39a and an operational amplifier 38a with respect to the potential $V_C$. Upper and lower amplitudes of the amplified rotor position signal are clipped by an amplitude limiter circuit comprised of a resistor 40a and diodes 41a and 42a at the two reference potentials $V_A$ and $V_B$. The amplified rotor position signal thus clipped is fed to the stator coil 3a via a subsequent coil drive circuit having power transistors 2a and 2b. In this manner, the voltage waveform applied to the stator coil 3a is a trapezoidal wave as shown at curve A in FIG. 18 which results from clipping the amplitude of the sinusoidal rotor position signal at the two reference potentials $V_A$ and $V_B$ with respect to the central potential $V_C$.

The output voltage of the Hall element 30a is substantially proportional to the input current fed thereto from the source of +Vcc voltage via the resistor. Accordingly, when the $V_A$ is increased to $V_A'$ as shown by curve A′ in FIG. 18 by varying the $v_s$ by means of an upper limit potential setting circuit, the input current to the Hall element 30a is increased and the output voltage is also increased. In response to the increase of the $V_A$ to $V_A'$, the $V_C$ is increased to a central level Vc′ of the $V_B$ and $V_A'$ and the output voltage of the Hall element 30a is amplified with respect to the updated central potential $V_C'$. Consequently, point D where the drive current waveform for the stator coil 30a crosses the central potential $V_C$ or point D′ where the drive current waveform crosses the central potential $V_C'$ lies at the center of the upper and lower amplitudes irrespective of variation in the $V_A$, and the switchover of the drive current for the stator coil is always effected on the central level. Moreover, the potential curve crosses the point D or D′ at an inclination which is increased or decreased in accordance with the variation in $V_A$. Therefore, the switchover of the coil drive current is effected at a minimal rate, thus preventing disturbance due to the current switchover.

The Hall elements 30a, 30b and 30c are out of phase from each other by an electrical angle of 120°. Similarly, the stator coils 3a, 3b and 3c are out of phase by the same electrical angle. Therefore, like the rotor position signal detected by the Hall element 30a, the amplitudes of rotor position signals from the Hall element 30b and 30c are so limited as to be converted into trapezoidal waveforms which in turn are fed to the stator coils 3b and 3c. Drive voltages $e_u$, $e_v$ and $e_w$ respectively applied to the three-phase stator coils 3a to 3c have waveforms and phase relationship as shown in FIG. 11. The stator coils 3a to 3c are connected in star connection, and current in one-phase stator coil is determined by a voltage across this stator coil, the difference between voltages across the remaining two-phase stator coils, and a counterelectromotive force induced in each of the three stator coils. The waveform $i_u$ shown in FIG. 11 is exemplified as the drive current in the u-phase stator coil 3a and is bidirectional in positive and negative directions. In addition, the drive current is switched over gradually and its waveform is approximately sinusoidal as a whole.

While the amplitude of the stator coil drive voltage is determined by the $V_A$ and $V_B$, the emitter potential $V_B$ of the transistor 46b is fixed by the constant voltage diode 47. The emitter potential $V_A$ of the transistor 46a can desirably be set by varying the base potential $V_S$ of the transistor 46a. Accordingly, by adjusting the amplitude of the stator coil drive voltage by varying the $v_s$, the motor torque and rotation speed can desirably be varied. The base potential $v_s$ may be controlled by the speed signal from the rotor speed sensor shown in FIG. 7. Any fluctuations such as for example ripples in the supply voltage Vcc will not affect the drive voltage waveform and the motor continues to rotate stably unless the fluctuations affect the operation of the emitter-follower transistor 46a and the power transistors 2a to 2f constituting the coil drive circuit.

It will be appreciated that the FIG. 15 embodiment eliminates the central potential setting resistors 37a, 37b and 37c and the resistor 51b constituting the differential amplifier as required for the FIG. 13 embodiment, and provides for the Hall element drive current setting resistors 57a to 57c and 58a to 58c across the upper and lower limit potentials. This construction of the FIG. 15 embodiment can attain practically the same effect as the foregoing embodiments by a reduced number of parts.

Figure 16:
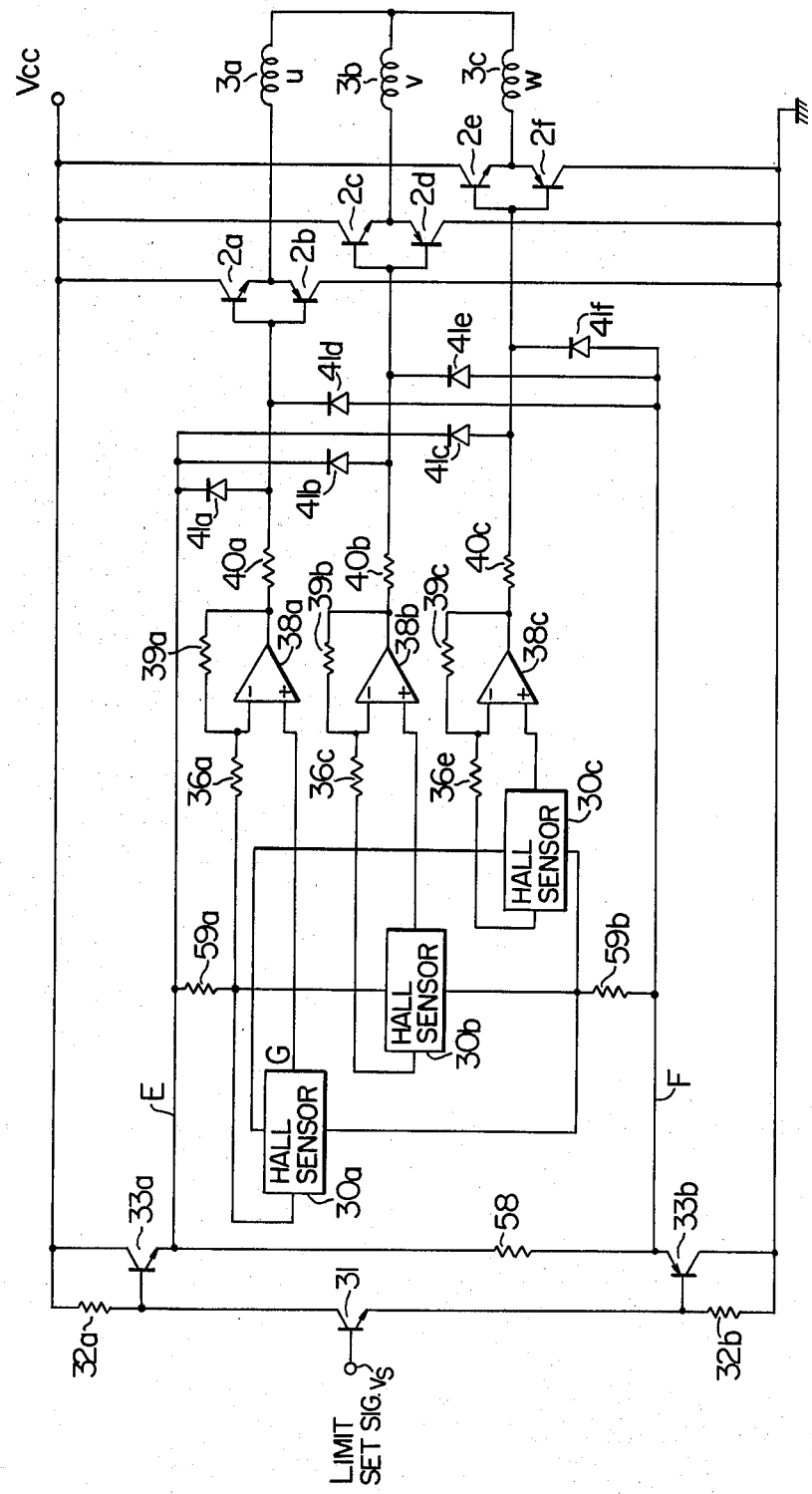

FIG. 16 shows a further embodiment of the invention which is a modification of the FIG. 9 embodiment. As shown, Hall elements 30a, 30b and 30c are connected across two points E and F at reference potentials via common resistors 59a and 59b. Since the resistors 59a and 59b have the same resistance which is selected to be sufficiently larger than the internal resistance of the Hall element, a point G bears the central potential of the reference potentials at the points E and F. Thus, this modification achieves the same operation and effects as the FIG. 15 embodiment. A transistor 31 has its collector connected to one pole of a power supply Vcc via a resistor 32a and its emitter connected to the other pole (ground side) via a resistor 32b having the same resistance as the resistor 32a. Accordingly, when neglecting currents branching to the bases of the transistors 33a and 33b, the same current flows through the resistors 32a and 32b, causing the same voltage drop across these resistors. Transistors 33a and 33b are connected in emitter-follower fashion and when neglecting the difference between base-emitter voltage drops of the transistor 33a and 33b, potential $V_E$ and $V_F$ at the points E and F are determined by the base potential $v_s$ of the transistor 31. Therefore, by varying the $v_s$, the potentials $V_E$ and $V_F$ can be varied simultaneously in the opposite directions to each other, whereby due to the fact that the resistors 59a and 59b have the same resistance, the central potential always becomes half the supply voltage Vcc. Accordingly, the stator coil drive voltage is centered to half the Vcc and power consumption in NPN type transistors 2a, 2c and 2e is equal to that in PNP transistors 2b, 2d and 2f, these transistor groups constituting a stator coil drive circuit.

In the modification shown in FIG. 16, the central potential $V_C$ is fixed and depending on the signal $v_s$ representative of the rotor speed, the upper potential $V_E$ and the lower potential $V_F$ are simultaneously varied with respect to the central potential $V_C$ at the same rate to ensure that the range of the stator coil drive voltage can be varied. In other words, the bias point of the Hall element is invariable with the magnitude of the $v_s$. The lower and upper limit range which is externally variable is larger than that of the FIG. 15 embodiment.

Figure 17:
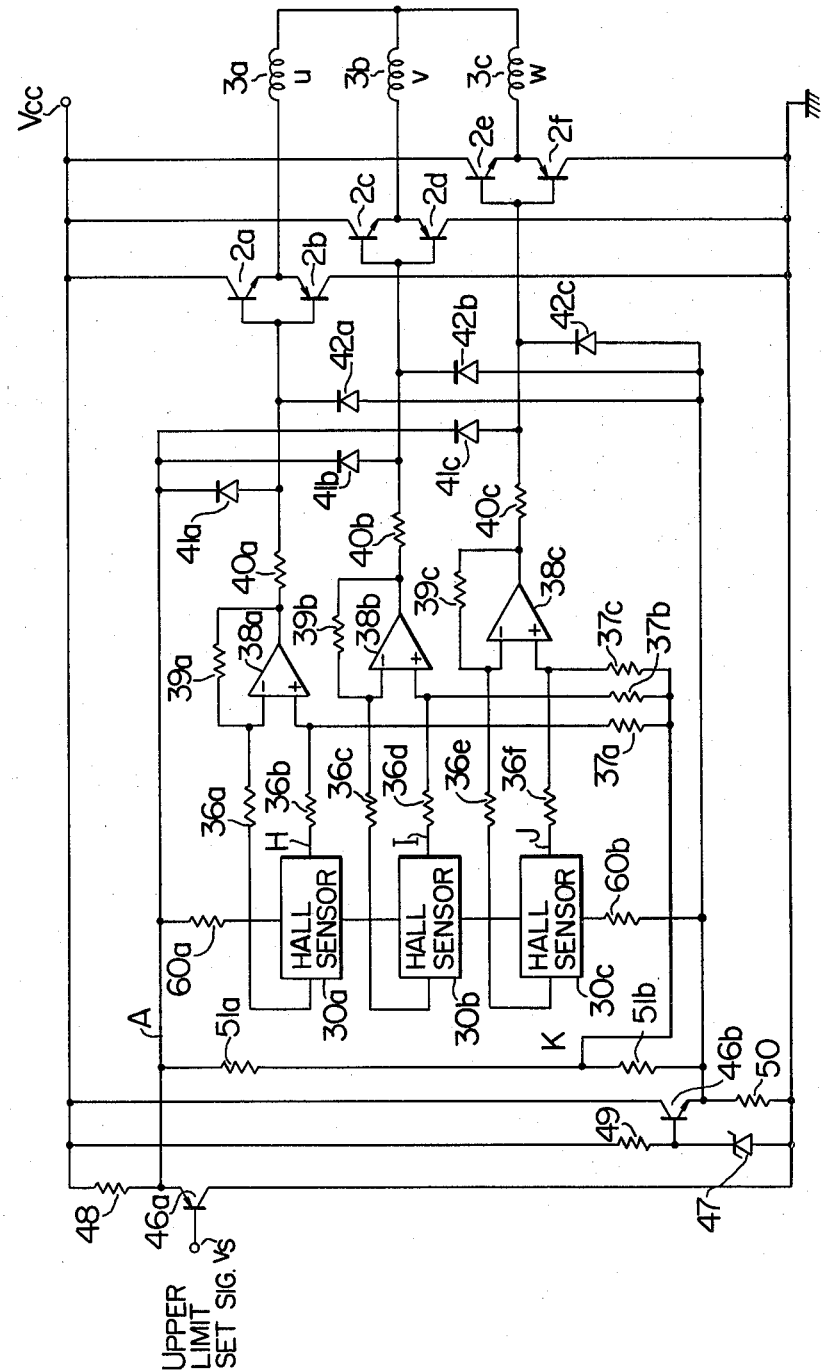

FIG. 17 shows a further embodiment of the invention which is a modification of the FIG. 13 embodiment. Particularly, in this modification, a series connection of Hall elements 30a to 30c is connected across an upper potential point A and a lower potential point B via resistors 60a and 60b for biasing the respective Hall elements. The resistors 60a and 60b have, like the foregoing embodiments, the same resistance which is selected to be sufficiently larger than the internal resistance of the Hall element. Accordingly, potentials at points H, I and J can bear the central potential of the potentials $V_A$ and $V_B$ so that this modified embodiment can achieve the same operation and effects as the FIG. 15 embodiment, especially, the Hall current is little dispersed. If the resistance of the resistors 60a and 60b is relatively small, the provision of resistors 51a and 51b having the same resistance and connected as shown in FIG. 17 makes potential $V_K$ at a point K equal to the central potential at the $V_A$ and $V_B$. In this case, each of operational amplifiers 38a to 38c cooperative with resistors 36b, 36d and 36f and resistors 37a, 37b and 37c produces a sinusoidal output voltage which is centered about the potential $V_K$ and which has, like the FIG. 15 embodiment, the waveform as shown by curve A' in FIG. 18 on the assumption that $V_K=V_C'$ and $V_A=V_A'$. Thus, one or both of the resistors 60a and 60b of the relatively small resistance may be omitted.

It will be appeciated that the PNP type transistors constituting the emitter-follower circuits for establishing the reference voltages i.e., lower and upper limits in the foregoing embodiments may be replaced by NPN type transistors, and the NPN transistors for the same purpose may be replaced by PNP type transistors. Further, the transistor 63 in FIG. 16 may be replaced by a PNP type transistor. Furthermore, if in the FIG. 15 and FIG. 17 embodiments the upper limit potential $V_A$ is fixed and the lower limit potential is variable, the operation and effect of these embodiments is unaffected.

We claim:
1. A DC brushless motor comprising:
(a) a rotor with a magnet,
(b) drive stator coils of at least three phases connected in star connection for driving the rotation of said rotor magnet,
(c) a power drive circuit associated with each of the phases for energizing said drive coil in response to a drive signal,

(d) position sensor means associated with each of the phases for detecting the position of said rotor and producing a position signal, (e) limit voltage setting means for producing first and second limit voltages, and (f) a drive signal generating circuit provided between said position sensor means and said power drive circuit for each of the phases, including means for generating a drive signal of a substantially-trapezoidal voltage waveform and supplying the same to said power drive circuit, said substantially-trapezoidal waveforms for the respective phases having their upper and lower amplitudes determined by said first and second limit voltages from the limit voltage setting means and being shifted by regular phases with one another and having inclinations with respect to the rotation angle of the rotor as determined by said position signal forming the changeover portions between the upper and lower limit amplitudes.

2. A DC brushless motor according to claim 1 which further comprises:

rotation speed detection means for detecting the rotation speed of said rotor to produce a voltage signal representative of a detected rotor speed, and control signal generating means connected between said limit voltage setting means and said rotation speed detection circuit and being responsive to the voltage signal representative of the detected rotor speed to produce a control signal for varying at least one of upper and lower limit voltage amplitudes of said drive signal.

3. A DC brushless motor according to claim 1 or 2 wherein said rotor position sensor means comprises a field sensor which detects changes in field of said rotor magnet to produce an analog signal.

4. A DC brushless motor according to claim 1 or 2 wherein said drive coils are of three-phase drive coils connected in star connection, whereby current in each of the three-phase drive coils is oriented in one direction during one period of 180° electrical angles and in the opposite direction during the other period of 180° electrical angles.

5. A DC brushless motor according to claim 1 or 2, wherein said drive signal generating circuit comprises:

an amplifier circuit causing the operation of said position sensor means to center to the central potential between said first and second limit voltages and amplifying the output of said position sensor means with respect to the central potential, and an amplitude limiter circuit connected to receive the amplified output voltage from said amplifier circuit and limiting the upper and lower amplitudes of the amplified output voltage at levels of said first and second limit voltages.

6. A DC brushless motor according to claim 5, wherein said limit voltage setting means set both of said first and second limit voltages to vary symmetrically with respect to the central potential between a supply voltage and ground, depending upon the control signal.

7. A DC brushless motor according to claim 6, wherein said limit voltage setting means comprises a control terminal applied with a control signal, a first transistor having first and second output terminals, and second and third transistors connected in emitter-follower connection and having control terminals respectively connected to said first and second output terminals, said second and third transistors having conduction types which are different from each other and connected between a single source of electrical power and ground via first and second emitter resistors connected at a junction at which said central potential is established, emitter-follower outputs of said second and third transistors variably providing said first and second limit voltages in response to said control signal.

8. A DC brushless motor according to claim 5, wherein said limit voltage setting means comprises first limit voltage setting means responsive to the control signal to produce a first limit voltage level which is variable, and second limit voltage setting means responsive to the control signal to produce a second limit voltage level which is fixed.

9. A DC brushless motor according to claim 8, wherein said first limit voltage setting means comprises a control terminal applied with a variable control signal, and a first transistor connected in emitter-follower connection and having an output terminal from which said first limit voltage is produced, wherein said second limit voltage setting means comprises a control terminal applied with an output of a constant voltage diode, and a second transistor connected in emitter-follower connection and having an output terminal from which said second limit voltage is produced, and wherein first and second resistors of the same resistance are connected in series between the output terminals of said first and second transistors, and the central potential for said amplifier circuit is produced from a junction of the first and second resistors.

10. A DC brushless motor according to claim 5, wherein said position sensors comprise Hall elements having drive terminals connected in series between third and fourth resistors coupled to said first and second limit voltages and having the same resistance which is sufficiently larger than the internal resistance of the Hall element, and wherein the output voltage of the Hall element is centered to the central potential of said first and second limit voltages.

11. A DC brushless motor according to claim 5, wherein said position sensors comprise Hall elements, wherein fifth and sixth resistors having the same resistance which is sufficiently larger than the internal resistance of said Hall element, and wherein said Hall elements are connected in parallel between said fifth and sixth resistors to center the operation of said amplifier circuit to the output voltage of said Hall element.

12. A DC brushless motor according to claim 5, wherein said position sensors comprise Hall elements, wherein a pair of seventh and eighth resistors coupled to said first and second limit voltages and having the same resistance which is sufficiently larger than the internal resistance of the Hall element are connected with each other through each of the Hall elements, and wherein the operation of said amplifier circuit is centered to the center of the output voltage from said Hall element.

13. A control circuit for a DC motor comprising:

(a) multi-phase stator windings opposing a rotor magnet of the DC motor and spaced apart therefrom by a slight gap in a star connection, (b) a winding drive circuit associated with each of the stator windings, for supplying exciting current to the stator winding from a single power supply, (c) field sensors detecting angular positions of said rotor magnet and applying output voltages therefrom to said winding drive circuits; and (d) control circuit means connected between said field sensor and said winding drive circuit and being responsive to sinusoidal outputs from said field sensors to produce a trapezoidal waveform voltage which in turn is applied as a drive signal to said winding drive circuit, said control circuit means including
- (i) limit voltage setting means for adjustably setting first and second limit voltages;
- (ii) an amplifier circuit causing the operation of said field sensor to center to the central potential between said first and second limit voltages and amplifying the output from said field sensor with respect to the central potential; and
- (iii) an amplitude limiter circuit connected to receive the amplified output voltage from said amplifier circuit and limiting upper and lower amplitudes of the amplified output voltage at levels of said first and second limit voltages to thereby generate the trapezoidal waveform voltage.

14. The control circuit according to claim 13, wherein said field sensor is a Hall element and the Hall element is biased at the central potential of said first and second limit voltages.

15. The control circuit according to claim 13, wherein said limit voltage setting means is supplied with a set control signal to variably set said limit voltage, said set control signal being dependent on a motor torque and motor speed to be required.

* * * * *